(12) United States Patent
Kwon et al.

(10) Patent No.: US 10,469,310 B2
(45) Date of Patent: Nov. 5, 2019

(54) SYSTEM AND METHOD FOR TRANSMIT POWER CONTROL

(71) Applicant: FutureWei Technologies, Inc., Plano, TX (US)

(72) Inventors: Younghoon Kwon, Laguna Niguel, CA (US); Pengfei Xia, San Diego, CA (US); Bin Liu, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 78 days.

(21) Appl. No.: 15/789,550

(22) Filed: Oct. 20, 2017

(65) Prior Publication Data

US 2019/0044792 A1  Feb. 7, 2019

Related U.S. Application Data

(60) Provisional application No. 62/541,862, filed on Aug. 7, 2017.

(51) Int. Cl.
*H04L 12/24* (2006.01)
*H04W 52/18* (2009.01)
*H04W 72/04* (2009.01)
*H04W 52/36* (2009.01)
*H04W 52/14* (2009.01)
*H04W 52/32* (2009.01)
(Continued)

(52) U.S. Cl.
CPC ......... *H04L 41/0654* (2013.01); *H04B 17/17* (2015.01); *H04W 52/146* (2013.01); *H04W 52/18* (2013.01); *H04W 52/325* (2013.01); *H04W 52/367* (2013.01); *H04W 52/42* (2013.01); *H04W 52/48* (2013.01); *H04W 72/0413* (2013.01); *H04W 52/362* (2013.01); *H04W 52/50* (2013.01); *H04W 88/02* (2013.01)

(58) Field of Classification Search
CPC ............ H04L 41/0654; H04W 52/367; H04W 72/0413; H04W 52/18; H04W 88/02
See application file for complete search history.

(56) References Cited

U.S. PATENT DOCUMENTS

2017/0078978 A1  3/2017 Scipione et al.
2018/0138962 A1* 5/2018 Islam ................... H04L 5/0048
(Continued)

FOREIGN PATENT DOCUMENTS

WO  2017024516 A1  2/2017

OTHER PUBLICATIONS

"3rd Generation Partnership Project; Technical Specification Group Radio Access Network; Study on New Radio (NR) Access Technology, (Release 14)," 3GPP TR 38.912, V1.0.0, Mar. 2017, 74 pages.

(Continued)

*Primary Examiner* — Min Jung
(74) *Attorney, Agent, or Firm* — Slater Matsil, LLP

(57) ABSTRACT

A method for operating a user equipment (UE) includes detecting that a beam failure has occurred, and based thereon, transmitting a first beam failure recovery request (BFRR) message at a first transmit power level on a first channel resource in a channel with a transmit power control mechanism configured to set the first transmit power level different from a first non-BFRR transmit power level of a first non-BFRR message transmitted on the first channel resource in the channel.

25 Claims, 5 Drawing Sheets

(51) Int. Cl.
*H04W 52/42* (2009.01)
*H04W 52/48* (2009.01)
*H04B 17/17* (2015.01)
*H04W 88/02* (2009.01)
*H04W 52/50* (2009.01)

(56) References Cited

U.S. PATENT DOCUMENTS

| | | | |
|---|---|---|---|
| 2018/0270689 A1* | 9/2018 | Akkarakaran | H04B 7/088 |
| 2018/0270895 A1* | 9/2018 | Park | H04W 8/18 |
| 2018/0323856 A1* | 11/2018 | Xiong | H04B 7/0695 |
| 2019/0037423 A1* | 1/2019 | Yu | H04W 24/04 |
| 2019/0053072 A1* | 2/2019 | Kundargi | H04B 7/0814 |
| 2019/0053166 A1* | 2/2019 | Nagaraja | H04W 76/27 |
| 2019/0053313 A1* | 2/2019 | Zhou | H04W 76/18 |

OTHER PUBLICATIONS

MCC Support, "Draft Report of 3GPP TSG RAN WG1 #89 v0.2.0," 3GPP TSG RAN WG1 Meeting #90, Prague, Czech Rep, Aug. 21-25, 2017, 166 pages.

* cited by examiner

SYSTEM AND METHOD FOR TRANSMIT POWER CONTROL

This application claims the benefit of U.S. Provisional Application No. 62/541,862, filed on Aug. 7, 2017, entitled "System and Method for Transmit Power Control," which application is hereby incorporated herein by reference.

TECHNICAL FIELD

The present disclosure relates generally to a system and method for digital communications, and, in particular embodiments, to a system and method for transmit power control.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at congested lower frequencies. However, pathloss is a significant issue in HF. Beamforming may be used to overcome the high pathloss.

Under certain conditions, a user equipment (UE) device may detect that an existing communications beam between a next generation (NG) NodeB (gNB) and the UE is not working as expected (i.e., there is a beam failure and/or loss) and there is a need to recover from this condition. In order to recover from the beam failure, the UE transmits a beam failure recovery request (BFRR) to the gNB. But there is no guarantee that the BFRR is received by the gNB. Transmit power control is one technique that is used to improve the likelihood of success of any transmission.

Therefore, there is a need for transmit power control mechanisms for transmitting BFRRs and similar transmissions.

SUMMARY

Example embodiments provide a system and method for transmit power control.

In accordance with an example embodiment, a method for operating a user equipment (UE) is provided. The method includes detecting, by the UE, that a beam failure has occurred, and based thereon, transmitting, by the UE, a first beam failure recovery request (BFRR) message at a first transmit power level on a first channel resource in a channel with a transmit power control mechanism configured to set the first transmit power level different from a first non-BFRR transmit power level of a first non-BFRR message transmitted on the first channel resource in the channel.

Optionally, in any of the preceding embodiments, wherein the first transmit power level is greater than the first non-BFRR transmit power level for the first non-BFRR message.

Optionally, in any of the preceding embodiments, wherein the method further comprises detecting, by the UE, that the first BFRR message was unsuccessfully transmitted, and based thereon, setting, by the UE, a second transmit power level for a second BFRR message determined in accordance with the transmit power control mechanism configured to set the second transmit power level greater than a second non-BFRR transmit power level of a second non-BFRR message is transmitted on a second channel resource in the channel, and transmitting, by the UE, the second BFRR message on the second channel resource at the second transmit power level.

Optionally, in any of the preceding embodiments, wherein the transmit power control mechanism is expressible as $$P\_BRACH = \min\{PCMAX(i), PRTP_{BRACH} + PLc\},$$

where:
PCMAX(i) is a configured maximum UE transmit power level for subframe i of a primary cell, PLc is a downlink pathloss estimate determined by the UE for the primary cell, and $PRTP_{BRACH}$ is expressible as $$PRTP_{BRACH} = PIRTP_{BRACH} + \Delta P_{BRACH} + (\text{Num\_trans}_{BRACH} - 1) * \text{PowerRampingStep}_{BRACH},$$

where:
$PIRTP_{BRACH}$ is a preamble initial received target power for the channel, $\Delta P_{BRACH}$ is a preamble format dependent offset value for the channel, $\text{Num\_trans}_{BRACH}$ is a preamble transmission counter value for the channel, and $\text{PowerRampingStep}_{BRACH}$ is a power ramping up step value for the channel.

Optionally, in any of the preceding embodiments, wherein the first channel resource is a beam failure random access channel (BRACH) resource and the channel is a BRACH.

Optionally, in any of the preceding embodiments, wherein $PIRTP_{BRACH}$ is set to a higher value for the first BFRR message than for the first non-BFRR message is transmitted on the first channel resource in the channel.

Optionally, in any of the preceding embodiments, wherein $\Delta P_{BRACH}$ is set to a higher value for the first BFRR message than for the first non-BFRR message is transmitted on the first channel resource in the channel.

Optionally, in any of the preceding embodiments, wherein $\text{PowerRampingStep}_{BRACH}$ is set to a higher value for the first BFRR message than for the first non-BFRR message is transmitted on the first channel resource in the channel.

Optionally, in any of the preceding embodiments, wherein $\text{Num\_trans}_{BRACH}$ is equal to one.

Optionally, in any of the preceding embodiments, wherein the transmit power control mechanism is expressible as $$P\_BRACH = \min\{PCMAX(i), PRTP_{BRACH} + PLc\},$$

where PCMAX(i) is a configured UE transmit power level for subframe i of a primary cell, PLc is a downlink pathloss estimate determined by the UE for the primary cell, and $PRTP_{BRACH}$ is expressible as $$PRTP_{BRACH} = PIRTP_{BRACH} + \Delta P_{BRACH} + \Delta_{BFRR} + (\text{Num\_trans}_{BRACH} - 1) * \text{PowerRampingStep}_{BRACH},$$

where $PIRTP_{BRACH}$ is a preamble initial received target power for the channel, $\Delta P_{BRACH}$ is a preamble format dependent offset value for the channel, $\Delta_{BFRR}$ is a BFRR offset that is added for BFRR transmissions and is zero (in dB) for non-BFRR transmissions, $\text{Num\_trans}_{BRACH}$ is a preamble transmission counter value for the channel, and $\text{PowerRampingStep}_{BRACH}$ is a power ramping up step value for the channel.

Optionally, in any of the preceding embodiments, wherein the transmit power control mechanism is expressible as $$P_{T\_BFRR} = \min\{PCMAX(i), P_{O\_BFRR} + \alpha_{BFRR} + \Delta_{TF} + f_{BFRR}(\Delta_{TPC}) + 10 \log M\},$$

where PCMAX(i) is a configured UE transmit power level for subframe i of a primary cell, $P_{O\_BFRR}$ is a target received power of a BFRR message, $\alpha_{BFRR}$ is a fractional PL compensation factor of a BFRR message, $\Delta_{TF}$ is a modulation and coding scheme (MCS) dependent component, $\Delta_{TPC}$ is a closed loop power control component, $f_{BFRR}(.)$ is an accumulation of closed loop power control results for a BFRR message, and M is a bandwidth.

Optionally, in any of the preceding embodiments, wherein the first channel resource is a physical uplink control channel (PUCCH) resource and the channel is a PUCCH.

Optionally, in any of the preceding embodiments, wherein $f_{BFRR}(\Delta_{TPC})$ is set to zero.

Optionally, in any of the preceding embodiments, wherein $f_{BFRR}(\Delta_{TPC})$ is set to a previously used $f_{BFRR}(\Delta_{TPC})$ value for the first non-BFRR message transmitted on the first channel resource in the channel.

Optionally, in any of the preceding embodiments, wherein $\alpha_{BFRR}$ is set to one for the first BFRR message.

Optionally, in any of the preceding embodiments, wherein $\alpha_{BFRR}$ for the first BFRR message is greater than an alternate $\alpha$ used for the first non-BFRR message transmitted on the first channel resource in the channel.

Optionally, in any of the preceding embodiments, wherein the first transmit power level is set to a predetermined value.

Optionally, in any of the preceding embodiments, wherein the predetermined value is equal to a maximum allowed transmission power.

In accordance with an example embodiment, a method for operating a device is provided. The method includes determining, by the device, an initial PRTP for a BFRR transmission on a channel resource in a channel with a transmit power control mechanism configured to set a transmit power level of the BFRR transmission different from a non-BFRR transmit power level of a non-BFRR message transmitted on the channel resource in the channel, and indicating, by the device, the initial PRTP for a BFRR to UEs.

Optionally, in any of the preceding embodiments, wherein the method further comprises maintaining, by the device, a first set of power control parameters for BFRR transmissions and a second set of power control parameters for non-BFRR transmissions.

Optionally, in any of the preceding embodiments, wherein the first set of power control parameters for BFRR transmissions is indicated to UEs in a unicast manner and the second set of power control parameters for non-BFRR transmissions is indicated to UEs in a broadcast manner.

Optionally, in any of the preceding embodiments, wherein the initial PRTP for a BFRR transmission is greater than an initial PRTP for the non-BFRR message transmitted on the channel resource in the channel.

In accordance with an example embodiment, a UE is provided. The UE includes one or more processors, and a computer readable storage medium storing programming for execution by the one or more processors. The programming including instructions to configure the UE to detect a beam failure, and transmit a first BFRR message at a first transmit power level on a first channel resource in a channel with a transmit power control mechanism configured to set the first transmit power level different from a non-BFRR transmit power level of a first non-BFRR message is transmitted on the first channel resource in the channel.

Optionally, in any of the preceding embodiments, wherein the programming includes instructions to configure the UE to detect that the first BFRR message was unsuccessfully transmitted, and based thereon, set a second transmit power level for a second BFRR message determined in accordance with the transmit power control mechanism configured to set the second transmit power level greater than a second non-BFRR transmit power level of a second non-BFRR message is transmitted on a second channel resource in the channel, and transmit the second BFRR message on the second channel resource at the second transmit power level.

Optionally, in any of the preceding embodiments, wherein the transmit power control mechanism is expressible as $$P\_BRACH = \min\{PCMAX(i), PRTP_{BRACH} + PLc\},$$

where:

PCMAX(i) is a configured maximum UE transmit power level for subframe i of a primary cell, PLc is a downlink pathloss estimate determined by the UE for the primary cell, and $PRTP_{BRACH}$ is expressible as $$PRTP_{BRACH} = PIRTP_{BRACH} + \Delta P_{BRACH} + (\text{Num\_trans}_{BRACH} - 1) * \text{PowerRampingStep}_{BRACH},$$

where:

$PIRTP_{BRACH}$ is a preamble initial received target power for the channel, $\Delta P_{BRACH}$ is a preamble format dependent offset value for the channel, $\text{Num\_trans}_{BRACH}$ is a preamble transmission counter value for the channel, and $\text{PowerRampingStep}_{BRACH}$ is a power ramping up step value for the channel.

Optionally, in any of the preceding embodiments, wherein the transmit power control mechanism is expressible as $$P\_BRACH = \min\{PCMAX(i), PRTP_{BRACH} + PLc\},$$

where PCMAX(i) is a configured UE transmit power level for subframe i of a primary cell, PLc is a downlink pathloss estimate determined by the UE for the primary cell, and $PRTP_{BRACH}$ is expressible as $$PRTP_{BRACH} = PIRTP_{BRACH} + \Delta P_{BRACH} + \Delta_{BFRR} + (\text{Num\_trans}_{BRACH} - 1) * \text{PowerRampingStep}_{BRACH},$$

where $PIRTP_{BRACH}$ is a preamble initial received target power for the channel, $\Delta P_{BRACH}$ is a preamble format dependent offset value for the channel, $\Delta_{BFRR}$ is a BFRR offset that is added for BFRR transmissions and is zero (in dB) for non-BFRR transmissions, $\text{Num\_trans}_{BRACH}$ is a preamble transmission counter value for the channel, and $\text{PowerRampingStep}_{BRACH}$ is a power ramping up step value for the channel.

Optionally, in any of the preceding embodiments, wherein the transmit power control mechanism is expressible as $$P_{T\_BFRR} = \min\{PCMAX(i), P_{O\_BFRR} + \alpha_{BFRR} PL + \Delta_{TF} + f_{BFRR}(\Delta_{TPC}) + 10 \log M\},$$

where PCMAX(i) is a configured UE transmit power level for subframe i of a primary cell, $P_{O\_BFRR}$ is a target received power of a BFRR message, $\alpha_{BFRR}$ is a fractional PL compensation factor of a BFRR message, $\Delta_{TF}$ is a modulation and coding scheme (MCS) dependent component, $\Delta_{TPC}$ is a closed loop power control component, $f_{BFRR}(.)$ is an accumulation of closed loop power control results for a BFRR message, and M is a bandwidth.

Practice of the foregoing embodiments enables an increase in the likelihood of success of an initial BFRR transmission. Furthermore, in the event that the initial BFRR transmission fails, the embodiments further increase the likelihood of success of subsequent retransmissions of the BFRR.

Practice of the foregoing embodiments allows a UE to promptly initiate beam failure recovery, allowing the UE to avoid transitioning to the radio link failure state.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
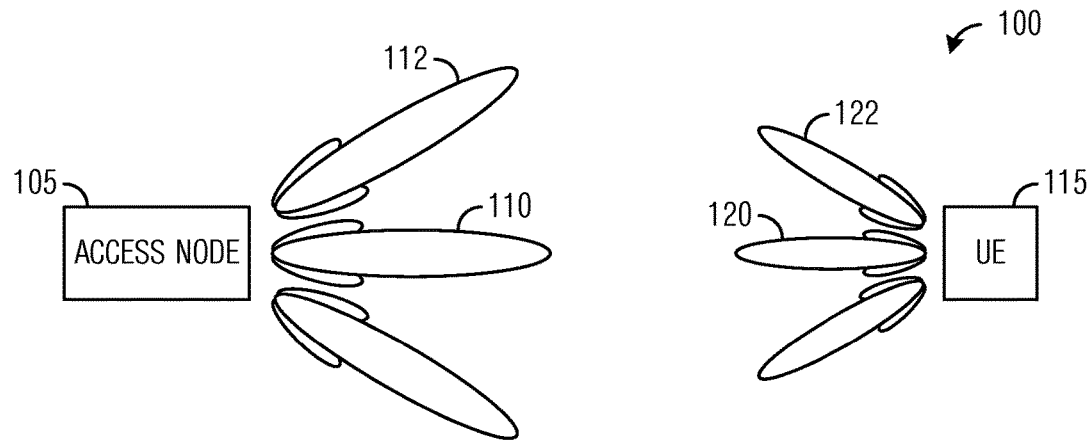
FIG. 1 illustrates an example wireless communications system according to example embodiments described herein.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as evolved NodeBs (eNBs), base stations, NodeBs, master eNBs (MeNBs), secondary eNBs (SeNBs), next generation (NG) NodeBs (gNBs), master gNBs (MgNBs), secondary gNBs (SgNBs), remote radio heads, access points, and the like, while UEs may also be commonly referred to as mobiles, mobile stations, terminals, subscribers, users, stations, and the like. A transmission point (TP) may be used to refer to any network entity capable of transmitting. Similarly, transmission-reception points (TRP) is a network entity that is capable of both transmitting and receiving, and commonly refer to access nodes, eNBs, gNBs, base stations, NodeBs, MeNBs, SeNBs, MgNBs, SgNBs, remote radio heads (RRHs), access points. In some situations, UEs (and similar devices) may also be operating as TRPs.

While it is understood that communications systems may employ multiple access nodes capable of communicating with a number of UEs, only one access node and one UE are illustrated for simplicity.

As discussed previously, pathloss in communications systems operating at high frequency (HF) (6 gigahertz (GHz) and above, such as millimeter wavelength (mm-Wave)) operating frequencies is high, and beamforming may be used to overcome the high pathloss. As shown in FIG. 1, both access node 105 and UE 115 communicate using beamformed transmissions and receptions. As an example access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

Figure 2:
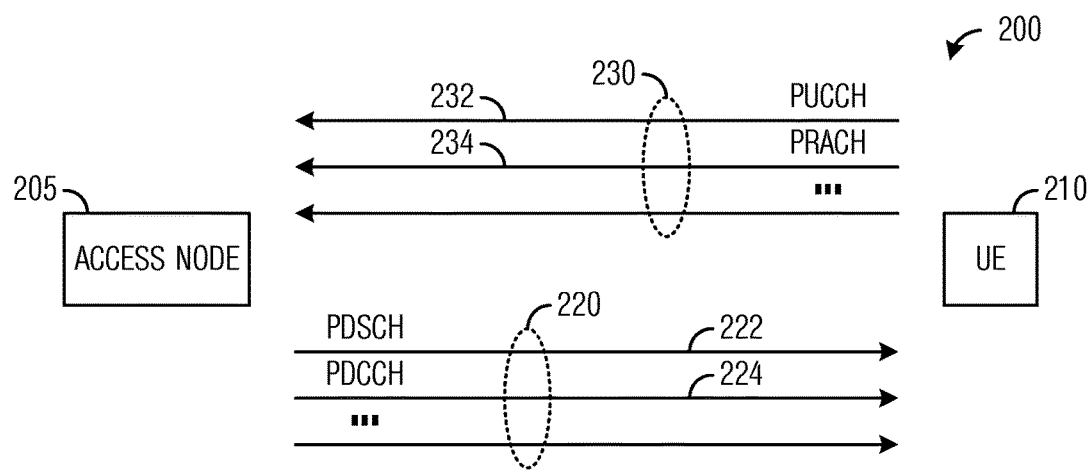
FIG. 2 illustrates a communications system highlighting an example channel structure between an access node and a UE according to example embodiments described herein.

FIG. 2 illustrates a communications system 2000 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232 and a physical random access channel (PRACH) 234 among others.

Figure 3:
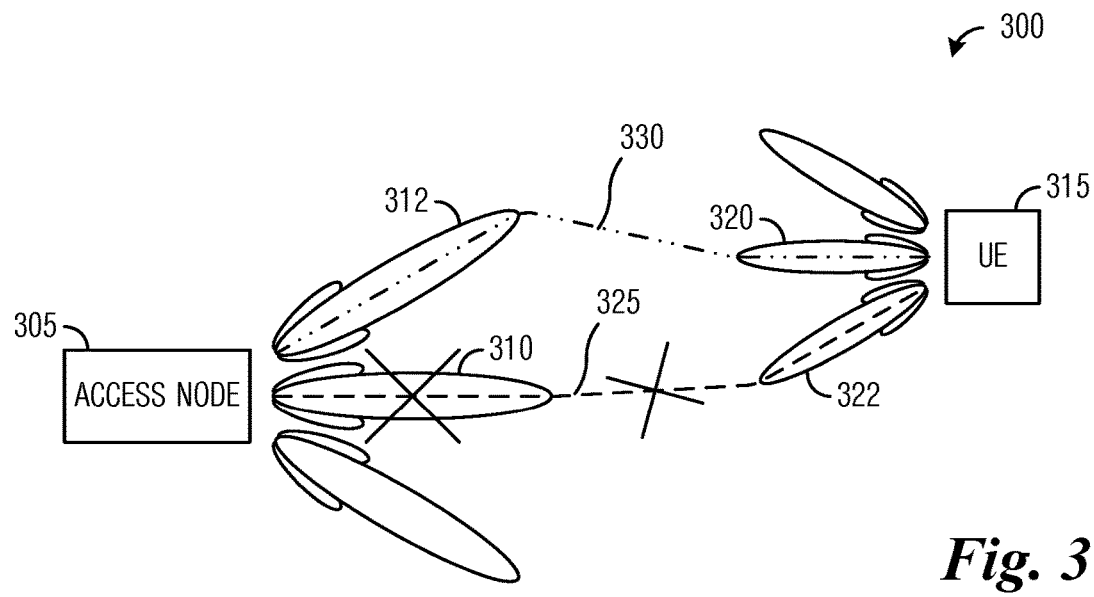
FIG. 3 illustrates a wireless communications system highlighting beam failure and beam failure recovery according to example embodiments described herein.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 205 to replace failed beam 310, for example. UE 315 initiates beam failure recovery by sending a BFRR to access node 305. Upon completion of the beam failure recovery, BPL 330 is established (comprising beams 312 and 320).

Figures 4, 5:
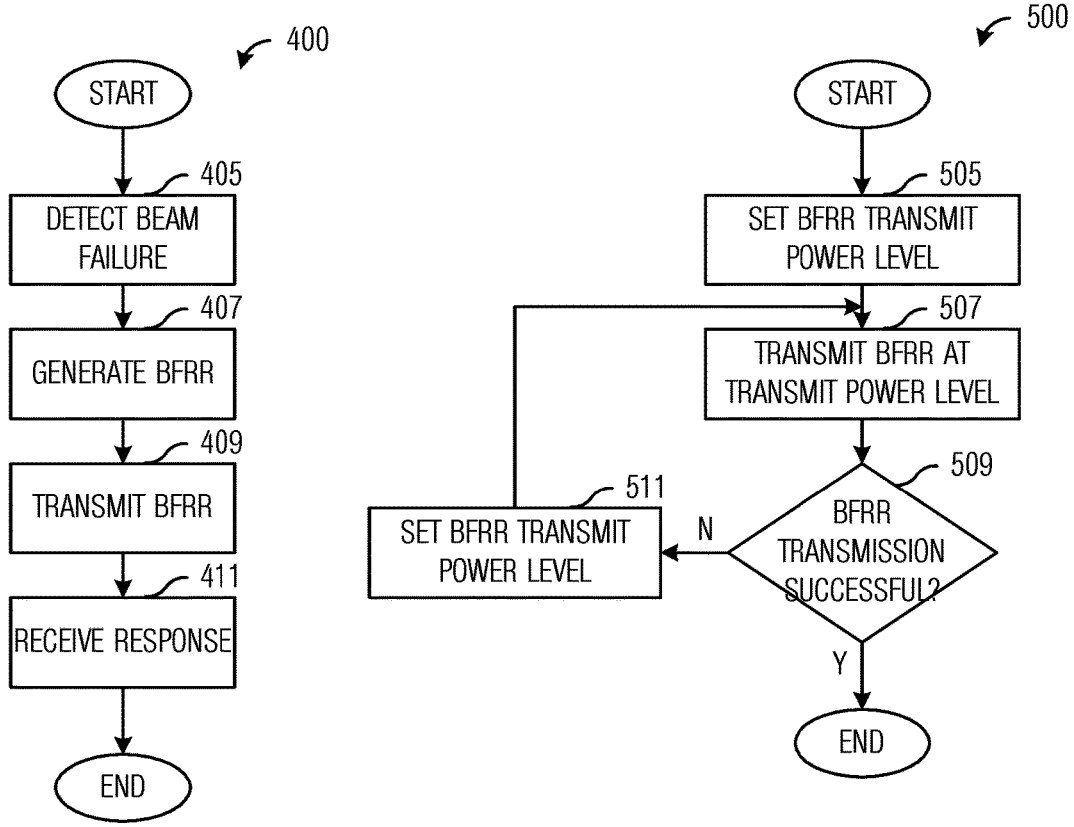
FIG. 4 illustrates a flow diagram of example operations occurring in the detection and recovery of a beam failure according to example embodiments described herein.
FIG. 5 illustrates a flow diagram of example operations occurring in a UE transmitting a BFRR according to example embodiments described herein.

FIG. 4 illustrates a flow diagram of example operations 400 occurring in the detection and recovery of a beam failure. Operations 400 may be indicative of operations occurring in a UE as the UE detects and recovers from a beam failure.

Operations 400 begin with the UE detecting a beam failure (block 405). The UE may be able to detect the beam failure using a variety of techniques. As an example, the UE detects the beam failure when a specified number of decoding attempts (optionally within a specified time window) have been unsuccessful. As another example, the UE detects the beam failure when a signal quality of a channel (such as signal to noise ratio (SNR), signal plus interference to noise ratio (SINR), channel quality indicator (CQI), received signal strength, and so on) falls below a specified threshold. As yet another example, the UE detects the beam failure when an error rate (such as bit error rate, frame error rate, packet error rate, and so on) exceeds a specified threshold. The UE generates a beam failure recovery request (BFRR) (block 407). The UE transmits the BFRR (block 409). The UE receives beam failure recovery response (block 411). The beam failure recovery response may include a message with recovery information, messaging for establishing a new beam, and so on.

In on-going Third Generation Partnership Project (3GPP) standardization activities on a fifth generation (5G) new radio (NR) architecture, agreements have been achieved for some aspects of BFRRs. The agreements include:

Support for BFRR transmission on the following,
A non-contention channel based upon the PRACH, which uses a resource orthogonal to resources of other PRACH transmissions (at least for frequency division multiplexed (FDM) operation),
Support using the PUCCH for BFRR transmission,
For further study, contention based PRACH resources as supplements to contention-free beam failure recovery resources, and
For further study, whether a UE is semi-statically configured to use one of the channels or both; and whether or not to support dynamic selection of one of the channels by a UE if the UE is configured to use both channels.

As specified in the 3GPP Long Term Evolution (LTE) technical standards, a baseline for the preamble transmission power P_RACH is expressible as:

$$P\_RACH=\min\{PCMAX(i), PREAMBLE\_RECEIVED\_TARGET\_POWER+PLc\}$$

where:

PCMAX(i) is the configured maximum UE transmit power level for subframe i of the primary cell, and PLc is the downlink pathloss estimate determined by the UE for the primary cell.

A target receive power level for the preamble transmitted by the UE in the PRACH, PREAMBLE_RECEIVED_TARGET_POWER (PRTP), is expressible as:

$$PRTP=PIRTP+\Delta P+(Num\_trans-1)*PowerRampingStep$$

where:

PIRTP is the preamble initial received target power,
$\Delta P$ is the preamble format dependent offset value,
Num_trans is the preamble transmission counter value, and
PowerRampingStep is the power ramping up step value.

If a BFRR transmission uses a non-contention channel based upon the PRACH, the BFRR transmission needs to use the transmit power control mechanism defined for PRACH transmissions. However, the existing PRACH transmit power control mechanism may not be adequate to be used for BFRR transmission. The existing PRACH transmit power control mechanism utilizes a power ramp up mechanism to reduce the interference of the PRACH transmission to other UEs and/or TRPs at the cost of longer access times (due to the greater probability of retransmission). Furthermore, the existing PRACH transmit power control mechanism does not consider beam-based (or beam pair link (BPL) based) pathloss calculation.

According to an example embodiment, systems and methods for transmitting a BFRR in a channel resource with a transmit power control mechanism configured for increased successful transmission probability by setting the transmit power level to a different power level are presented. The configuration of the transmit power control mechanism to increase the successful transmission probability (by setting the transmitting power level to a different or higher power level, for example) helps to satisfy the greater urgency associated with BFRR transmissions by reducing the probability of retransmissions and decreased access time at the cost of increased interference to other UEs and/or TRPs, which is generally acceptable to prevent the UE from transitioning to a radio link failure state.

In an embodiment, systems and methods for transmitting a BFRR in a beam failure random access channel (BRACH) resource of a BRACH with a configurable power ramp up transmit power control mechanism is presented. A BRACH is a non-contention channel based upon the PRACH or some other PRACH-like channel (e.g., channels with parameters of the preamble sequence different from those used in the PRACH channel, channels with resource configurations different from those used in the PRACH channel, and so on), and may be used for delivering BFRR information. It is noted that the transmit power of a transmission has an impact on the successful transmission probability, where higher transmit power transmissions typically have a greater successful transmission probability. Therefore, the configurable power ramp up transmit power control mechanism used with the BRACH is configured to set the transmit power level so that the successful transmission probability is greater than if the existing PRACH transmit power control mechanism is used with the BRACH. As an example, the configurable power ramp up transmit power control mechanism sets the transmit power level to be higher for BRACH transmissions than for PRACH transmissions.

From the equation for setting the transmit power level of the existing PRACH transmit power control mechanism, an example expression for determining the transmit power level for a transmission on a BRACH resource is $$P\_BRACH=\min\{PCMAX(i), PRTP_{BRACH}+PLc\},$$

where $PRTP_{BRACH}$ is the preamble received target power for the BRACH.

Therefore, it is possible to increase the successful transmission probability by increasing the $PRTP_{BRACH}$, where an example expression for determining the $PRTP_{BRACH}$ is $$PRTP_{BRACH}=PIRTP_{BRACH}+\Delta P_{BRACH}+(Num\_trans_{BRACH}-1)*PowerRampingStep_{BRACH},$$

where:

$PIRTP_{BRACH}$ is the preamble initial received target power for the BRACH,
$\Delta P_{BRACH}$ is the preamble format dependent offset value for the BRACH,
$Num\_trans_{BRACH}$ is the preamble transmission counter value for the BRACH, and
$PowerRampingStep_{BRACH}$ is the power ramping up step value for the BRACH.

Hence, $PRTP_{BRACH}$ may be increased by:
Setting $PIRTP_{BRACH}$ higher for BFRR transmissions than for PRACH transmissions,
Setting $\Delta P_{BRACH}$ higher for BFRR transmissions than for PRACH transmissions,
Setting $PowerRampingStep_{BRACH}$ higher for BFRR transmissions than for PRACH transmissions, and/or
Adding an additional parameter that compensates for a BFRR offset $\Delta_{BFRR}$, which changes the expression for $PRTP_{BRACH}$ to $$PRTP_{BRACH} = PIRTP_{BRACH} + \Delta P_{BRACH} + \Delta_{BFRR} + (\text{Num\_trans}_{BRACH} - 1) * \text{PowerRamping-Step}_{BRACH},$$

where $\Delta_{BFRR}$ is a BFRR offset that is added for BFRR transmissions and is zero (in dB) for non-BFRR transmissions. Furthermore, it may be possible to prevent the retransmission of BFRRs by setting a maximum value for Num_trans$_{BRACH}$ to one (1).

With respect to the determining of the downlink pathloss estimate PLc, a TRP may send multiple synchronization signals (SS) in multiple directions (beam directions, for example). The TRP may also allocate multiple BRACH opportunities in multiple directions. It is likely that the multiple SS and multiple BRACH opportunities are associated such that one SS transmission and one BRACH signal received are reciprocally quasi co-located (QCLed), or similarly, beam correspondence holds between one SS transmission and one BRACH signal reception. In general, beam correspondence holds at a TRP when the TRP is able to identify its transmit beam based on a receive beam and/or the TRP is able to identify its receive beam based on the transmit beam. QCL defines a relationship between two reference signals and/or data signals such that the two signals may be viewed as possessing similar characteristics. The spatial QCL information includes associations between CSI-RS and SS signals. As an example, in a one-to-one association, each CSI-RS signal is associated with one SS signal. It is possible that multiple CSI-RS signals are associated with a single SS, and vice versa. The spatial QCL information may be stored in tabular form or in a memory of the UE. Therefore, spatial QCL implies a situation where beam correspondence holds between a transmit beam of a SS block and a receive beam of a BRACH.

As an example, a UE measures a SS for the determining of PLc and transmits a BFRR at a BRACH opportunity that is reciprocally QCLed to the SS. As another example, a UE measures a SS for the determining of PLc and transmits a BFRR at a BRACH opportunity that is not reciprocally QCLed to the SS with compensated pathloss, where the UE compensates for a beamforming gain difference between the SS reception and the BFRR transmission.

In an embodiment, systems and methods for transmitting a BFRR in a dedicated BRACH resource of a BRACH with a predefined power level is presented. As an example, the predefined transmit power level for a BFRR transmission (P_BFRR) is set to the configured maximum UE transmit power level for subframe i of the primary cell (PCMAX(i)). If the BFRR transmission fails, the UE transmits the BFRR again with the same transmit power level as the initial BFRR transmission. Alternatively, the predefined transmit power level for a BFRR transmission P_BFRR is set to a value lower than PCMAX(i), i.e., P_BFRR<=PCMAX(i). Additionally, it may be possible to prevent the retransmission of BFRRs by setting a maximum value for Num_trans$_{BRACH}$ to one (1).

In an embodiment, systems and methods for transmitting a BFRR in a dedicated BRACH resource of a BRACH with a configurable fractional compensation transmit power control mechanism is presented. The transmit power level of the BFRR transmission is determined based on previous (e.g., closed loop) power control in the PDSCH and/or PDCCH. As an example, a UE determines the downlink pathloss estimate PLc in accordance with a channel state information reference signal (CSI-RS) that is associated with a previously received PDSCH and/or PDCCH. In another embodiment, the CSI-RS corresponds to a beam that the UE reports in the BFRR transmission as a candidate beam for use as a replacement for the failed beam. In determining the downlink pathloss estimate from the CSI-RS (that is associated with a previously received PDSCH and/or PDCCH), if the UE knows a beamforming gain difference between the PDSCH/PDCCH and the SS block, the UE may consider the beamforming gain difference in determining the downlink pathloss estimate. The UE may determine the transmit power level of the BFRR transmission in accordance with the previously received CSI-RS if the UE has spatial QCL information linking the SS block and a CSI-RS resource conveying the CSI-RS (that is associated with a previously received PDSCH and/or PDCCH).

In an embodiment, the UE transmit power level $P_T$ for regular transmissions on PUCCH and/or PUSCH is expressible as $$P_T = P_O + \alpha PL + \Delta_{TF} + f(\Delta_{TPC}) + 10 \log M,$$

where:
$P_O$ is the target received power,
$\alpha$ is the fractional PL compensation factor,
$\Delta_{TF}$ is a modulation and coding scheme (MCS) dependent component,
$\Delta_{TPC}$ is the closed loop power control component,
f(.) is the accumulation of closed loop power control results, and
M is the bandwidth.

Then, the transmit power level of the BFRR transmission may be determined in accordance with previous power control in the PDSCH and/or PDCCH. An example expression for determining the transmit power level of the BFRR transmission is $$P_{T\_BFRR} = P_{O\_BFRR} + \alpha_{BFRR} PL + \Delta_{TF} + f_{BFRR}(\Delta_{TPC}) + 10 \log M,$$

where:
$P_{O\_BFRR}$ is the target received power of the BFRR,
$\alpha_{BFRR}$ is the fractional PL compensation factor for the BFRR,
$\Delta_T$ is a modulation and coding scheme (MCS) dependent component,
$\Delta_{TPC}$ is the closed loop power control component,
$f_{BFRR}(.)$ is the accumulation of closed loop power control results for the BFRR, and
M is the bandwidth.

Then, $\Delta_T$ may be set to a value that corresponds to the BFRR preamble reception performance, M may be set to the bandwidth that the BFRR transmission occupies. As an example, $f_{BFRR}(\Delta_{TPC})$ is set to zero (0) for no closed loop power control. As another example, a previous $f_{BFRR}(\Delta_{TPC})$ value for the PUCCH and/or PUSCH is used.

In another embodiment, the UE transmit power level $P_T$ for regular transmissions on PUCCH and/or PUSCH is expressible as $$P_T = \min\{PCMAX(i), P_O + \alpha PL + \Delta_{TF} + f(\Delta_{TPC}) + 10 \log M\}.$$

Then, the transmit power level of the BFRR transmission may be determined in accordance with previous power control in the PDSCH and/or PDCCH. An example expression for determining the transmit power level of the BFRR transmission is $$P_{T\_BFRR} = \min\{PCMAX(i), P_{O\_BFRR} + \alpha_{BFRR} PL + \Delta_{TF} + f_{BFRR}(\Delta_{TFC}) + 10 \log M\}.$$

Then, $\Delta_{TF}$ may be set to a value that corresponds to the BFRR preamble reception performance, M may be set to the bandwidth that the BFRR transmission occupies. As an example, $f_{BFRR}(\Delta_T PC)$ is set to zero (0) for no closed loop power control. As another example, a previous $f_{BFRR}(\Delta_{TPC})$ value for the PUCCH and/or PUSCH is used.

It is noted that different sets of power control parameters are maintained for BFRR transmissions and non-BFRR transmissions (such as PRACH, PDSCH, PDCCH, and so on) transmissions. As an example, a first set of power control parameters is maintained for BFRR transmissions on the PRACH, while a second set of power control parameters is maintained for random access preamble transmissions on the PRACH. Additionally, different sets of power control parameters may be maintained for different types of BFRR transmissions. As an example, a first set of power control parameters for BFRR transmissions on the PRACH or some other PRACH-like channel is indicated to UEs in unicast manner, while a second set of power control parameters for random access preamble transmission on the PRACH is indicated to UEs in broadcast manner. As an example, a first set of power control parameters is maintained for BFRR transmissions on the PRACH or some other PRACH-like channel, while a second set of power control parameters is maintained for BFRR transmissions on the PUCCH. As another example, a first set of power control parameters is maintained for BFRR transmissions on the PRACH that is frequency-division-multiplexed with transmissions on the PRACH for initial access, while a second set of power control parameters is maintained for BFRR transmissions on the PRACH that shares (code-division-multiplexed, for example) resources with transmissions on the PRACH for initial access.

Because the BFRR transmission may be very time critical, successful reception of the BFRR transmission by the TRP is more important than interference mitigation for other UEs, cells, or sectors. Therefore, even though the PUCCH and/or PUSCH transmit power control mechanism is used for the BFRR transmission, full compensation for the pathloss is proposed (i.e., $\alpha_{BFRR}=1$). Alternatively, compensation for the pathloss for BFRR transmissions is set higher than for normal PUCCH and/or PUSCH transmissions (i.e., $\alpha_{BFRR}>=\alpha_{PUCCH/PUSCH}$).

In an embodiment, systems and methods for transmitting a BFRR in a dedicated PUCCH resource of a PUCCH with a configurable fractional pathloss compensation transmit power control mechanism is presented. The conventional transmit power control mechanism for the PUCCH is used. The downlink pathloss estimate PLc may be determined by the UE from a CSI-RS associated with a previously received PDSCH and/or PDCCH transmission. In another embodiment, the CSI-RS corresponds to a beam that the UE reports in the BFRR transmission as a candidate beam for use as a replacement for the failed beam. In determining the downlink pathloss estimate from the CSI-RS associated with the previously received PDSCH and/or PDCCH transmission, if the UE knows a beamforming gain difference between the PDSCH and/or PDCCH transmission and the SS block, the UE considers the beamforming gain difference in determining the downlink pathloss estimate. The UE may determine the transmit power level of the BFRR transmission in accordance with the previously received CSI-RS if the UE has spatial QCL information linking the SS block and a CSI-RS resource conveying the CSI-RS (that is associated with a previously received PDSCH and/or PDCCH).

Because the BFRR transmission may be very time critical, successful reception of the BFRR transmission by the TRP is more important than interference mitigation for other UEs, cells, or sectors. Therefore, even though the PUCCH and/or PUSCH transmit power control mechanism is used for the BFRR transmission, different parameter values are used for BFRR transmissions. As an example, full compensation for the pathloss is proposed (i.e., $\alpha_{BFRR}=1$). Alternatively, compensation for the pathloss for BFRR transmissions is set higher than for normal PUCCH and/or PUSCH transmissions (i.e., $\alpha_{BFRR}>=\alpha_{PUCCH/PUSCH}$). As yet another example, $f_{BFRR}(\Delta_{TPC})$ is set to zero (0) for no closed loop power control. As another example, a previous $f_{BFRR}(\Delta_{TPC})$ value for the PUCCH and/or PUSCH is used. As yet another example, PO_BFRR (or a target received power for BFRR transmissions) is set to a higher level than for normal PUCCH and/or PUSCH transmissions. As yet another example, an additional parameter that compensates for a BFRR offset $\Delta_{BFRR}$ is added to an expression for BFRR transmissions.

FIG. 5 illustrates a flow diagram of example operations 500 occurring in a UE transmitting a BFRR. Operations 500 may be indicative of operations occurring in a UE as the UE transmits a BFRR in a channel resource.

Operations 500 begin with the UE setting a transmit power level of the BFRR transmission (block 505). As discussed previously, the high level of urgency associated with BFRR transmissions suggest that increased successful transmission probability outweighs potentially negative interference side-effects. Therefore, the transmit power level of the BFRR transmission may be set at a higher level than what a conventional transmit power control mechanism associated with a random access or control channel resource would normally specify. The UE transmits the BFRR (block 507). The UE performs a check to determine if the BFRR transmission was successful (block 509). The UE may be able to determine that the BFRR transmission was successful if a beam failure recovery procedure is initiated within a specified amount of time, for example. Alternatively, the UE may determine that the BFRR transmission was successful if the UE receives a positive acknowledgement from the TRP within a specified amount of time.

If the BFRR transmission was successful, operations 500 end. If the BFRR transmission was not successful, the UE sets the BFRR transmit power level (block 511) and returns to block 507 to transmit the BFRR transmission. The BFRR transmit power level may be set (or otherwise adjusted) in accordance with any of the example embodiments presented herein.

Figure 6:
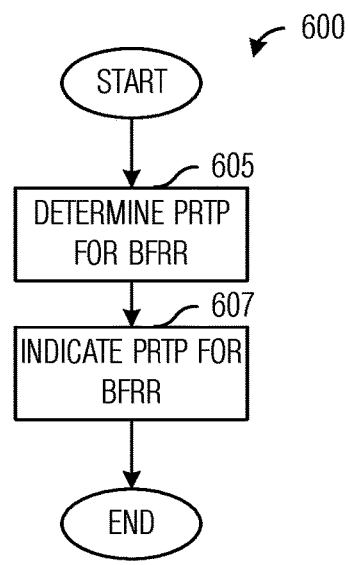
FIG. 6 illustrates a flow diagram of example operations occurring in a device configuring BFRR operations according to example embodiments described herein.

FIG. 6 illustrates a flow diagram of example operations 600 occurring in a device configuring BFRR operations. Operations 600 may be indicative of operations occurring at a device, such as an access node, TRP, and so on, as the device configures BFRR operations.

Operations 600 begin with the device determining a PRTP for a BFRR transmission occurring in a channel resource, such as $PRTP_{BFRR}$ (block 605). As discussed previously, the high level of urgency associated with BFRR transmissions suggest that increased successful transmission probability outweighs potentially negative interference side-effects. Therefore, the transmit power level of the BFRR transmission may be set at a higher level than what a conventional transmit power control mechanism associated with a random access or control channel resource would normally specify. It is possible to have different PRTPs for different random access or control channel resources. As an example, a BFRR transmission on a BRACH resource would have a first PRTP, while a non-BFRR transmission on a PRACH resource would have a second PRTP, and so on. The device indicates the PRTP for BFRR transmissions occurring in the channel resources (block 607).

Figure 7:
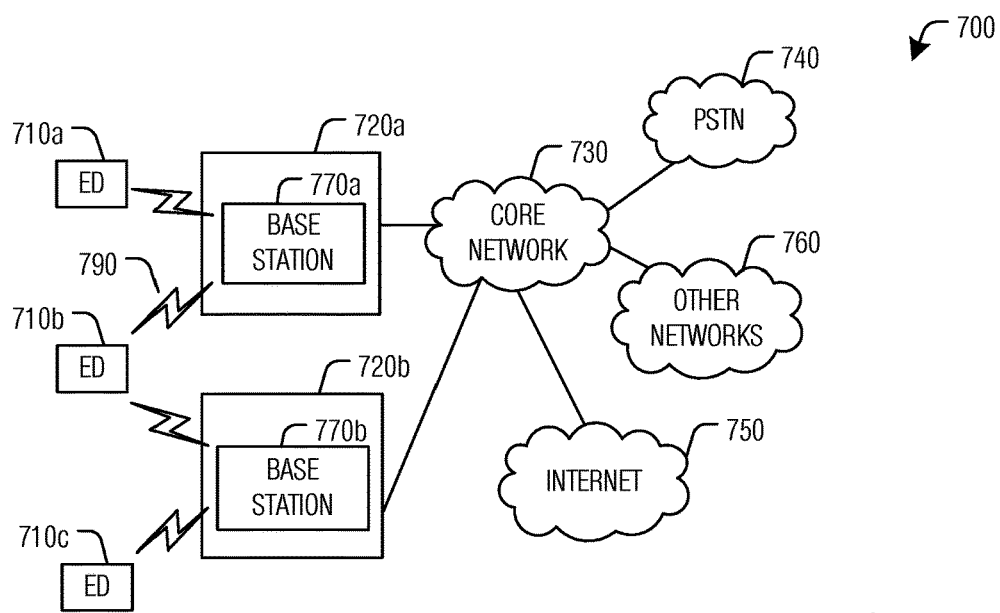
FIG. 7 illustrates an example communication system according to example embodiments described herein.

FIG. 7 illustrates an example communication system 700. In general, the system 700 enables multiple wireless or wired users to transmit and receive data and other content. The system 700 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 700 includes electronic devices (ED) 710*a*-710*c*, radio access networks (RANs) 720*a*-720*b*, a core network 730, a public switched telephone network (PSTN) 740, the Internet 750, and other networks 760. While certain numbers of these components or elements are shown in FIG. 7, any number of these components or elements may be included in the system 700.

The EDs 710*a*-710*c* are configured to operate and/or communicate in the system 700. For example, the EDs 710*a*-710*c* are configured to transmit and/or receive via wireless or wired communication channels. Each ED 710*a*-710*c* represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 720*a*-720*b* here include base stations 770*a*-70*b*, respectively. Each base station 770*a*-770*b* is configured to wirelessly interface with one or more of the EDs 710*a*-710*c* to enable access to the core network 730, the PSTN 740, the Internet 750, and/or the other networks 760. For example, the base stations 770*a*-770*b* may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 710*a*-710*c* are configured to interface and communicate with the Internet 750 and may access the core network 730, the PSTN 740, and/or the other networks 760.

In the embodiment shown in FIG. 7, the base station 770*a* forms part of the RAN 720*a*, which may include other base stations, elements, and/or devices. Also, the base station 770*b* forms part of the RAN 720*b*, which may include other base stations, elements, and/or devices. Each base station 770*a*-770*b* operates to transmit and/or receive wireless signals within a particular geographic region or area, sometimes referred to as a "cell." In some embodiments, multiple-input multiple-output (MIMO) technology may be employed having multiple transceivers for each cell.

The base stations 770*a*-770*b* communicate with one or more of the EDs 710*a*-710*c* over one or more air interfaces 790 using wireless communication links. The air interfaces 790 may utilize any suitable radio access technology.

It is contemplated that the system 700 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 720*a*-720*b* are in communication with the core network 730 to provide the EDs 710*a*-710*c* with voice, data, application, Voice over Internet Protocol (VoIP), or other services. Understandably, the RANs 720*a*-720*b* and/or the core network 730 may be in direct or indirect communication with one or more other RANs (not shown). The core network 730 may also serve as a gateway access for other networks (such as the PSTN 740, the Internet 750, and the other networks 760). In addition, some or all of the EDs 710*a*-710*c* may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 750.

Although FIG. 7 illustrates one example of a communication system, various changes may be made to FIG. 7. For example, the communication system 700 could include any number of EDs, base stations, networks, or other components in any suitable configuration.

Figure 8A:
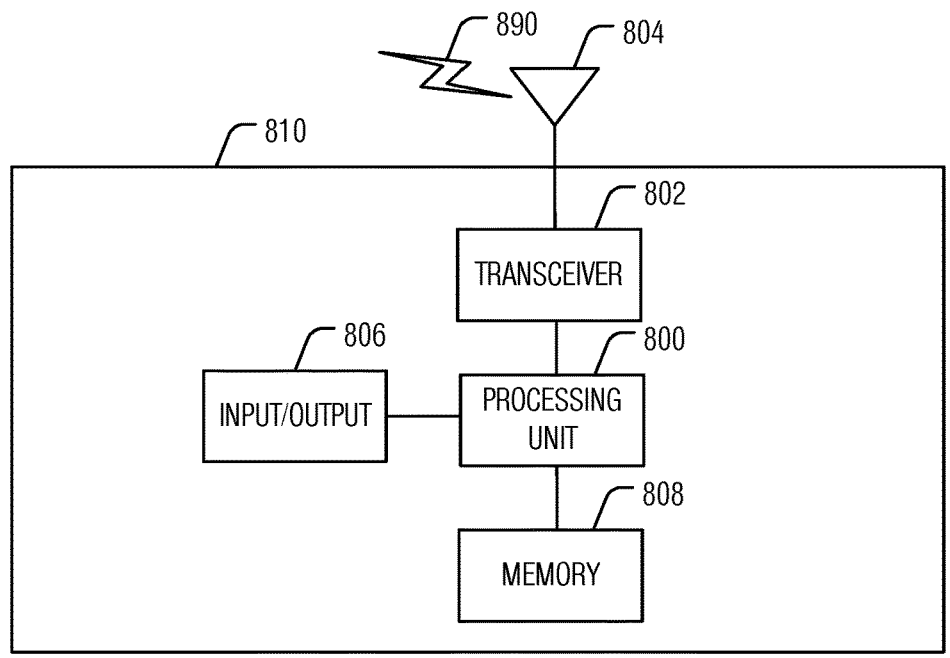
FIGS. 8A and 8B illustrate example devices that may implement the methods and teachings according to this disclosure.
Figure 8B:
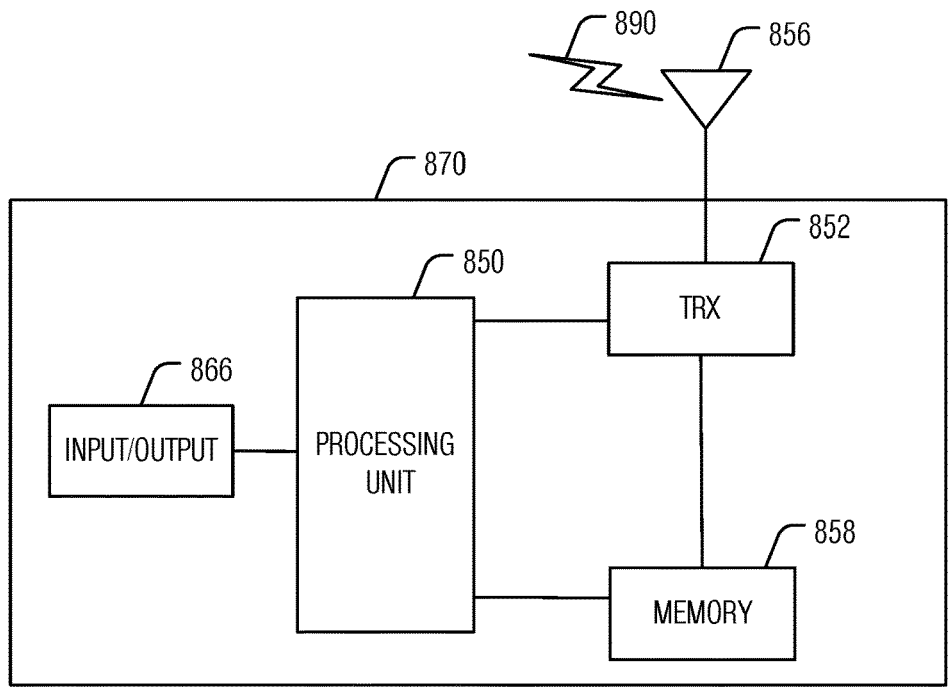

FIGS. 8A and 8B illustrate example devices that may implement the methods and teachings according to this disclosure. In particular, FIG. 8A illustrates an example ED 810, and FIG. 8B illustrates an example base station 870. These components could be used in the system 700 or in any other suitable system.

As shown in FIG. 8A, the ED 810 includes at least one processing unit 800. The processing unit 800 implements various processing operations of the ED 810. For example, the processing unit 800 could perform signal coding, data processing, power control, input/output processing, or any other functionality enabling the ED 810 to operate in the system 700. The processing unit 800 also supports the methods and teachings described in more detail above. Each processing unit 800 includes any suitable processing or computing device configured to perform one or more operations. Each processing unit 700 could, for example, include a microprocessor, microcontroller, digital signal processor, field programmable gate array, or application specific integrated circuit.

The ED 810 also includes at least one transceiver 802. The transceiver 802 is configured to modulate data or other content for transmission by at least one antenna or NIC (Network Interface Controller) 804. The transceiver 802 is also configured to demodulate data or other content received by the at least one antenna 804. Each transceiver 802 includes any suitable structure for generating signals for wireless or wired transmission and/or processing signals received wirelessly or by wire. Each antenna 804 includes any suitable structure for transmitting and/or receiving wireless or wired signals. One or multiple transceivers 802 could be used in the ED 810, and one or multiple antennas 804 could be used in the ED 810. Although shown as a single functional unit, a transceiver 802 could also be implemented using at least one transmitter and at least one separate receiver.

The ED 810 further includes one or more input/output devices 806 or interfaces (such as a wired interface to the Internet 750). The input/output devices 806 facilitate interaction with a user or other devices (network communications) in the network. Each input/output device 806 includes any suitable structure for providing information to or receiving/providing information from a user, such as a speaker, microphone, keypad, keyboard, display, or touch screen, including network interface communications.

In addition, the ED 810 includes at least one memory 808. The memory 808 stores instructions and data used, generated, or collected by the ED 810. For example, the memory 808 could store software or firmware instructions executed by the processing unit(s) 800 and data used to reduce or eliminate interference in incoming signals. Each memory 808 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 8B, the base station 870 includes at least one processing unit 850, at least one transceiver 852, which includes functionality for a transmitter and a receiver, one or more antennas 856, at least one memory 858, and one or more input/output devices or interfaces 866. A scheduler, which would be understood by one skilled in the art, is coupled to the processing unit 850. The scheduler could be included within or operated separately from the base station 870. The processing unit 850 implements various processing operations of the base station 870, such as signal coding, data processing, power control, input/output processing, or any other functionality. The processing unit 850 can also support the methods and teachings described in more detail above. Each processing unit 850 includes any suitable processing or computing device configured to perform one or more operations. Each processing unit 850 could, for example, include a microprocessor, microcontroller, digital signal processor, field programmable gate array, or application specific integrated circuit.

Each transceiver 852 includes any suitable structure for generating signals for wireless or wired transmission to one or more EDs or other devices. Each transceiver 852 further includes any suitable structure for processing signals received wirelessly or by wire from one or more EDs or other devices. Although shown combined as a transceiver 852, a transmitter and a receiver could be separate components. Each antenna 856 includes any suitable structure for transmitting and/or receiving wireless or wired signals. While a common antenna 856 is shown here as being coupled to the transceiver 852, one or more antennas 856 could be coupled to the transceiver(s) 852, allowing separate antennas 856 to be coupled to the transmitter and the receiver if equipped as separate components. Each memory 858 includes any suitable volatile and/or non-volatile storage and retrieval device(s). Each input/output device 866 facilitates interaction with a user or other devices (network communications) in the network. Each input/output device 866 includes any suitable structure for providing information to or receiving/providing information from a user, including network interface communications.

Figure 9:
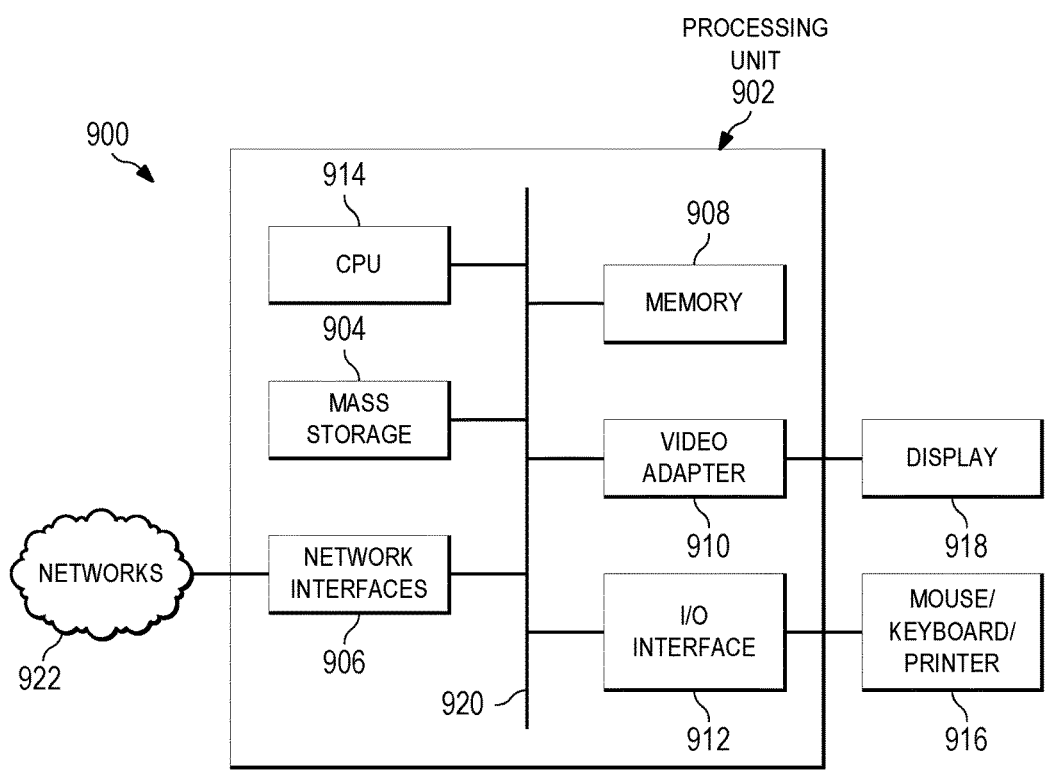
FIG. 9 is a block diagram of a computing system that may be used for implementing the devices and methods disclosed herein.

FIG. 9 is a block diagram of a computing system 900 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 800 includes a processing unit 902. The processing unit includes a central processing unit (CPU) 914, memory 908, and may further include a mass storage device 804, a video adapter 910, and an I/O interface 912 connected to a bus 920.

The bus 920 may be one or more of any type of several bus architectures including a memory bus or memory controller, a peripheral bus, or a video bus. The CPU 914 may comprise any type of electronic data processor. The memory 908 may comprise any type of non-transitory system memory such as static random access memory (SRAM), dynamic random access memory (DRAM), synchronous DRAM (SDRAM), read-only memory (ROM), or a combination thereof. In an embodiment, the memory 908 may include ROM for use at boot-up, and DRAM for program and data storage for use while executing programs.

The mass storage 904 may comprise any type of non-transitory storage device configured to store data, programs, and other information and to make the data, programs, and other information accessible via the bus 920. The mass storage 904 may comprise, for example, one or more of a solid state drive, hard disk drive, a magnetic disk drive, or an optical disk drive.

The video adapter 910 and the I/O interface 912 provide interfaces to couple external input and output devices to the processing unit 902. As illustrated, examples of input and output devices include a display 918 coupled to the video adapter 910 and a mouse/keyboard/printer 916 coupled to the I/O interface 912. Other devices may be coupled to the processing unit 902, and additional or fewer interface cards may be utilized. For example, a serial interface such as Universal Serial Bus (USB) (not shown) may be used to provide an interface for an external device.

The processing unit 902 also includes one or more network interfaces 906, which may comprise wired links, such as an Ethernet cable, and/or wireless links to access nodes or different networks. The network interfaces 906 allow the processing unit 902 to communicate with remote units via the networks. For example, the network interfaces 906 may provide wireless communication via one or more transmitters/transmit antennas and one or more receivers/receive antennas. In an embodiment, the processing unit 902 is coupled to a local-area network 922 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a detecting unit/module, a determining unit/module, and/or an indicating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a user equipment (UE), the method comprising:
   detecting, by the UE, that a beam failure has occurred, and based thereon:
      setting, by the UE using a transmit power control mechanism, a first initial beam failure recovery request (BFRR) transmit power level greater than a first initial non-BFRR transmit power level of a first non-BFRR message transmitted on a first channel resource in a channel, and
      transmitting, by the UE, a first BFRR message at the first initial BFRR transmit power level on the first channel resource in the channel.

2. The method of claim 1, further comprising detecting, by the UE, that the first BFRR message was unsuccessfully transmitted, and based thereon:
    setting, by the UE using the transmit power control mechanism, a second transmit power level greater than a second non-BFRR transmit power level of a second non-BFRR message transmitted on a second channel resource in the channel; and
    transmitting, by the UE, a second BFRR message on the second channel resource at the second transmit power level.

3. The method of claim 2, wherein the transmit power control mechanism is expressible as $$P\_BRACH = \min\{PCMAX(i), PRTP_{BRACH} + PLc\},$$

where:
    PCMAX(i) is a configured maximum UE transmit power level for subframe i of a primary cell, PLc is a downlink pathloss estimate determined by the UE for the primary cell, and $PRTP_{BRACH}$ is expressible as $$PRTP_{BRACH} = PIRTP_{BRACH} + \Delta P_{BRACH} + (\text{Num\_trans}_{BRACH} - 1) * \text{PowerRampingStep}_{BRACH},$$

where:
    $PIRTP_{BRACH}$ is a preamble initial received target power for the channel, $\Delta P_{BRACH}$ is a preamble format dependent offset value for the channel, $\text{Num\_trans}_{BRACH}$ is a preamble transmission counter value for the channel, and $\text{PowerRampingStep}_{BRACH}$ is a power ramping up step value for the channel.

4. The method of claim 3, wherein the first channel resource is a beam failure random access channel (BRACH) resource and the channel is a BRACH.

5. The method of claim 3, wherein $PIRTP_{BRACH}$ is set to a higher value for the first BFRR message than for the first non-BFRR message transmitted on the first channel resource in the channel.

6. The method of claim 3, wherein $\Delta P_{BRACH}$ is set to a higher value for the first BFRR message than for the first non-BFRR message transmitted on the first channel resource in the channel.

7. The method of claim 3, wherein $\text{PowerRampingStep}_{BRACH}$ is set to a higher value for the first BFRR message than for the first non-BFRR message transmitted on the first channel resource in the channel.

8. The method of claim 3, wherein $\text{Num\_trans}_{BRACH}$ is equal to one.

9. The method of claim 2, wherein the transmit power control mechanism is expressible as $$P\_BRACH = \min\{PCMAX(i), PRTP_{BRACH} + PLc\},$$

where PCMAX(i) is a configured UE transmit power level for subframe i of a primary cell, PLc is a downlink pathloss estimate determined by the UE for the primary cell, and $PRTP_{BRACH}$ is expressible as $$PRTP_{BRACH} = PIRTP_{BRACH} + \Delta P_{BRACH} + \Delta_{BFRR} + (\text{Num\_trans}_{BRACH} - 1) * \text{PowerRampingStep}_{BRACH},$$

where $PIRTP_{BRACH}$ is a preamble initial received target power for the channel, $\Delta P_{BRACH}$ is a preamble format dependent offset value for the channel, $\Delta_{BFRR}$ is a BFRR offset that is added for BFRR transmissions and is zero (in dB) for non-BFRR transmissions, $\text{Num\_trans}_{BRACH}$ is a preamble transmission counter value for the channel, and $\text{PowerRampingStep}_{BRACH}$ is a power ramping up step value for the channel.

10. The method of claim 2, wherein the transmit power control mechanism is expressible as $$P_{T\_BFRR} = \min\{PCMAX(i), P_{O\_BFRR} + \alpha_{BFRR}PL + \Delta_{TF} + f_{BFRR}(\Delta_{TPC}) + 10 \log M\},$$

where PCMAX(i) is a configured UE transmit power level for subframe i of a primary cell, $P_{O\_BFRR}$ is a target received power of a BFRR message, $\alpha_{BFRR}$ is a fractional PL compensation factor of a BFRR message, $\Delta_{TF}$ is a modulation and coding scheme (MCS) dependent component, $\Delta_{TPC}$ is a closed loop power control component, $f_{BFRR}(.)$ is an accumulation of closed loop power control results for a BFRR message, and M is a bandwidth.

11. The method of claim 10, wherein the first channel resource is a physical uplink control channel (PUCCH) resource and the channel is a PUCCH.

12. The method of claim 11, wherein $f_{BFRR}(\Delta_{TPC})$ is set to zero.

13. The method of claim 11, wherein $f_{BFRR}(\Delta_{TPC})$ is set to a previously used $f_{BFRR}(\Delta_{TPC})$ value for the first non-BFRR message transmitted on the first channel resource in the channel.

14. The method of claim 11, wherein $\alpha_{BFRR}$ is set to one for the first BFRR message.

15. The method of claim 11, wherein $\alpha_{BFRR}$ for the first BFRR message is greater than an alternate α used for the first non-BFRR message transmitted on the first channel resource in the channel.

16. The method of claim 1, wherein the first initial BFRR transmit power level is set to a predetermined value.

17. The method of claim 16, wherein the predetermined value is equal to a maximum allowed transmission power.

18. A method for operating a device, the method comprising:
    setting, by the device using a transmit power control mechanism, an initial preamble received target power (PRTP) for a beam failure recovery request (BFRR) transmission on a channel resource in a channel,
        the initial PRTP for the BFRR transmission being greater than an initial PRTP for a non-BFRR message transmitted on the channel resource in the channel, and
        the transmit power control mechanism configured to set a transmit power level of the BFRR transmission different from a non-BFRR transmit power level of the non-BFRR message transmitted on the channel resource in the channel; and
    indicating, by the device, the initial PRTP for the BFRR transmission to user equipments (UEs).

19. The method of claim 18, further comprising maintaining, by the device, a first set of power control parameters for BFRR transmissions and a second set of power control parameters for non-BFRR transmissions.

20. The method of claim 19, further comprising:
    indicating, by the device, the first set of power control parameters for BFRR transmissions to UEs in a unicast manner; and
    indicating, by the device, the second set of power control parameters for non-BFRR transmissions in a broadcast manner.

21. A user equipment (UE) comprising:
    one or more processors; and
    a computer readable storage medium storing programming for execution by the one or more processors, the programming including instructions to configure the UE to:

detect a beam failure,
set, using a transmit power control mechanism, a first initial beam failure recovery request (BFRR) transmit power level greater than a first initial non-BFRR transmit power level of a first non-BFRR message transmitted on a first channel resource in a channel, and
transmit a first BFRR message at the first initial BFRR transmit power level on the first channel resource in the channel.

22. The UE of claim 21, wherein the programming includes instructions to configure the UE to detect that the first BFRR message was unsuccessfully transmitted, and based thereon:
set, using the transmit power control mechanism, a second transmit power level greater than a second non-BFRR transmit power level of a second non-BFRR message transmitted on a second channel resource in the channel; and
transmit a second BFRR message on the second channel resource at the second transmit power level.

23. The UE of claim 22, wherein the transmit power control mechanism is expressible as $$P\_BRACH = \min\{PCMAX(i), PRTP_{BRACH}+PLc\},$$

where:
PCMAX(i) is a configured maximum UE transmit power level for subframe i of a primary cell, PLc is a downlink pathloss estimate determined by the UE for the primary cell, and $PRTP_{BRACH}$ is expressible as $$PRTP_{BRACH}=PIRTP_{BRACH}+\Delta P_{BRACH}+(\text{Num\_trans}_{BRACH}-1)*\text{PowerRampingStep}_{BRACH},$$

where:
$PIRTP_{BRACH}$ is a preamble initial received target power for the channel, $\Delta P_{BRACH}$ is a preamble format dependent offset value for the channel, $\text{Num\_trans}_{BRACH}$ is a preamble transmission counter value for the channel, and $\text{PowerRampingStep}_{BRACH}$ is a power ramping up step value for the channel.

24. The UE of claim 22, wherein the transmit power control mechanism is expressible as $$P\_BRACH = \min\{PCMAX(i), PRTP_{BRACH}+PLc\},$$

where PCMAX(i) is a configured UE transmit power level for subframe i of a primary cell, PLc is a downlink pathloss estimate determined by the UE for the primary cell, and $PRTP_{BRACH}$ is expressible as $$PRTP_{BRACH}=PIRTP_{BRACH}+\Delta P_{BRACH}+\Delta_{BFRR}+(\text{Num\_trans}_{BRACH}-1)*\text{PowerRampingStep}_{BRACH},$$

where $PIRTP_{BRACH}$ is a preamble initial received target power for the channel, $\Delta P_{BRACH}$ is a preamble format dependent offset value for the channel, $\Delta BFRR$ is a BFRR offset that is added for BFRR transmissions and is zero (in dB) for non-BFRR transmissions, $\text{Num\_trans}_{BRACH}$ is a preamble transmission counter value for the channel, and $\text{PowerRampingStep}_{BRACH}$ is a power ramping up step value for the channel.

25. The UE of claim 22, wherein the transmit power control mechanism is expressible as $$P_{T\_BFRR}=\min\{PCMAX(i), P_{O\_BFRR}+\alpha_{BFRR}PL+\Delta_{TF}+f_{BFRR}(\Delta_{TPC})+10\log M\},$$

where PCMAX(i) is a configured UE transmit power level for subframe i of a primary cell, $P_{O\_BFRR}$ is a target received power of a BFRR message, $\alpha_{BFRR}$ is a fractional PL compensation factor of a BFRR message, $\Delta_{TF}$ is a modulation and coding scheme (MCS) dependent component, $\Delta_{TPC}$ is a closed loop power control component, $f_{BFRR}(.)$ is an accumulation of closed loop power control results for a BFRR message, and M is a bandwidth.

* * * * *